United States Patent [19]
Cohen

[11] Patent Number: 5,647,796
[45] Date of Patent: Jul. 15, 1997

[54] METHOD OF SIMULATING PICTURES FOR INFANTS AND VERY YOUNG CHILDREN

[76] Inventor: Justin R. Cohen, 10010 Walsham Ct., Richmond, Va. 23233

[21] Appl. No.: 556,338

[22] Filed: Nov. 13, 1995

Related U.S. Application Data

[62] Division of Ser. No. 495,024, Jun. 27, 1995, Pat. No. 5,556,339.
[51] Int. Cl.$^6$ ..................................................... A63F 9/24
[52] U.S. Cl. .................................................... 463/1
[58] Field of Search ............................. 463/1, 7, 31, 37; 273/435–438; 434/307 R, 308; 395/152, 154, 927; 345/156

[56] References Cited

U.S. PATENT DOCUMENTS

| | | | |
|---|---|---|---|
| 4,522,100 | 6/1985 | Ishii | 84/609 |
| 5,265,888 | 11/1993 | Yamamoto et al. | 273/434 |
| 5,358,259 | 10/1994 | Best | 273/434 |

OTHER PUBLICATIONS

Microsoft Powerpoint Handbook, Microsoft, Corp. 1992 pp. 85, 481–482, 491–492.
Parent's Guide to Children's Software 96, Editors of Newsweek pp. 37, 38, 67, 76, 79, 97, and 176–178.
The MacAuthority, The Cobb Group, Dec. 1993, vol. 2, No. 12.

*Primary Examiner*—Jessica Harrison
*Assistant Examiner*—Michael O'Neill

[57] ABSTRACT

The present invention is a method of electronically simulating the creation of a predetermined composite picture for an infant or very young child. The method results in an audiovisual effect on a display screen that simulates the creation of the composite picture (e.g., the painting of a picture, the fitting together of picture puzzle pieces, connecting a prearranged pattern of dots to form a picture, etc.) in response to input by an infant or very young child. The method of the present invention requires the use of a computer (or processor), a display screen, and a keyboard (or input wand or other input device). The method involves interaction with a user (e.g. a child seated at the computer), who provides an input signal by banging on the keyboard (or shaking the input wand or activating other input devices). The computer processor in turn, responds to each input signal by presenting on the display screen another portion of the picture properly positioned, whereby an audiovisual simulation of creating a picture automatically progresses. According to this method, an infant or very young child can easily interact with a computer controlling the progression of the creation of a picture.

12 Claims, 8 Drawing Sheets

METHOD OF SIMULATING PICTURES FOR INFANTS AND VERY YOUNG CHILDREN

This is a divisional of Application Ser. No. 08/495,024 filed Jun. 27, 1995, now U.S. Pat No. 5,556,339.

BACKGROUND OF THE INVENTION

I. Field of the Invention

This invention relates to video games and toys, and in particular to a unique educational computer toy that allows an infant or very young child to easily control the progress by which a composite picture is created.

II. Description of Related Art

The ability of infants and very young children to learn through interaction with properly designed toys is widely recognized. The normal toys for this age group have included busy-boxes, musical toys, stuffed animals and the like. Computer toys for infants and very young children, however, are generally not available.

While computer games for older children (i.e. over two years of age) are widely marketed, they are generally not appropriate for infants or very young children. In action-type computer games, for example, the player must perform quick, dexterous actions in response to sudden events occurring on-screen. These events occur at times and in a manner determined by the computer, with the tempo and the character of the events intensifying to the point that a very young child would become overwhelmed. In computer puzzle and word games the player must match wits with the computer or another player to such a degree that the educational background of a very young child would be insufficient.

BRIEF SUMMARY OF THE INVENTION

I. Nature and Substance of the Invention

It is certainly desirable to extend the existing repertory of childrens toys to include computer toys suitable for infants and very young children.

Recently, a few simple interactive computer programs for infants and very young children have been offered for sale in the commercial market. These programs display various shapes and sounds in response to random key strikes made by an infant or small child banging on the keyboard.

While such computer toys initially attract the notice of very young children, they are limited with respect to holding a very young child's attention for an extended length of time. In particular, a very young child will quickly lose interest in these toys because of their abstract nature and the fact that they do not involve the child in a familiar activity relevant to the child. Moreover, their educational value is restricted in that the shapes are randomly placed on the display screen and are not integrated into a composite design, recognizable picture, or other predetermined pattern.

To overcome these difficulties, the present invention is a computer toy that simulates the creation of picture by, for example, painting a picture, fitting together the pieces of a picture puzzle, connecting a prearranged pattern of dots to form a picture, etc., while allowing the child to control the progression of the simulation.

Moreover, because the activity is predetermined in the computer toy of the present invention, the infant or very young child is not required to react with quick dexterous movements nor draw upon complex prelearned mental skills. In fact, he or she need only use those skills necessary to actuate an input device such as banging on a keyboard or shaking a computer wand.

In this fashion, the child is not only encouraged to improve his or her motor skills by actuating an input device, but is also motivated to learn the association between his or her action and the progress of a simulated activity. Furthermore, because this invention totally involves the child as an active participant in a familiar activity, something not possible with current computer toys for infants and very young children, the child is not relegated to a passive role which often leads to frustration and loss of interest.

II. Objects of the Invention

It is an object of the present invention to provide a computer toy with which an infant or a very young child can easily play and interact.

Another object of the present invention is to provide a computer toy that will fascinate and hold the interest of an infant or very young child for an extended length of time.

Another object of the present invention is to provide a computer toy which will encourage an infant or very young child to improve his or her motor skills.

Still a further object of the present invention is to provide a computer toy which will motivate an infant or very young child to recognize the connection between his or her actions and the response of a computer.

In order to achieve the above objects, the present invention can provide various different simulations. Therefore, using the computer toy of the present invention an infant or very young child can simulate painting a picture, fitting together the pieces of a picture puzzle, connecting dots to form a picture, etc.

Additional objects and advantages of the invention are set forth in the drawings, description, and claims which follow. Some objects and advantages will be obvious from the instrumentalities and combinations particularly pointed out while other objects and advantages may be learned by the practice of the invention.

BRIEF DESCRIPTION OF THE DRAWINGS

The following drawings, which are incorporated in and constitute a part of the specification, serve to explain the principles of the present invention when they are taken together with the general description given above and the detailed description of the preferred embodiments given below. Moreover, the aforementioned objects and advantages of the present invention, as well as additional objects and advantages thereof, will become apparent when consideration is given to the following detailed description which should be read in conjunction with the following drawings wherein.

DETAILED DESCRIPTION OF THE INVENTION

The present invention is a computer toy meant to be played with by an infant or young child. This computer toy may require the use of a computer (or processor), a display screen, and an input device or may be self contained with a specially designed processor, screen display, and input device being part of the toy itself. To provide a complete and thorough understanding, this specification sets forth many different but specific embodiments and configurations as illustrative of the present invention with well known systems shown in diagrammatic form. Nevertheless, the present invention may be practiced by application of numerous modifications obvious to those skilled in the art without making use of the specific details shown and described.

Preferably, as a computer implemented process, the computer toy of the present invention will be disposed within a floppy disk, an optical compact disk, or an electronic cartridge. When transferred to the computer being utilized, the present invention allows the processor to simulate on a display screen the creation of a predetermined composite picture, said simulation progressing automatically in response to input signals which are generated and sent to the computer by an input device.

Figure 1:
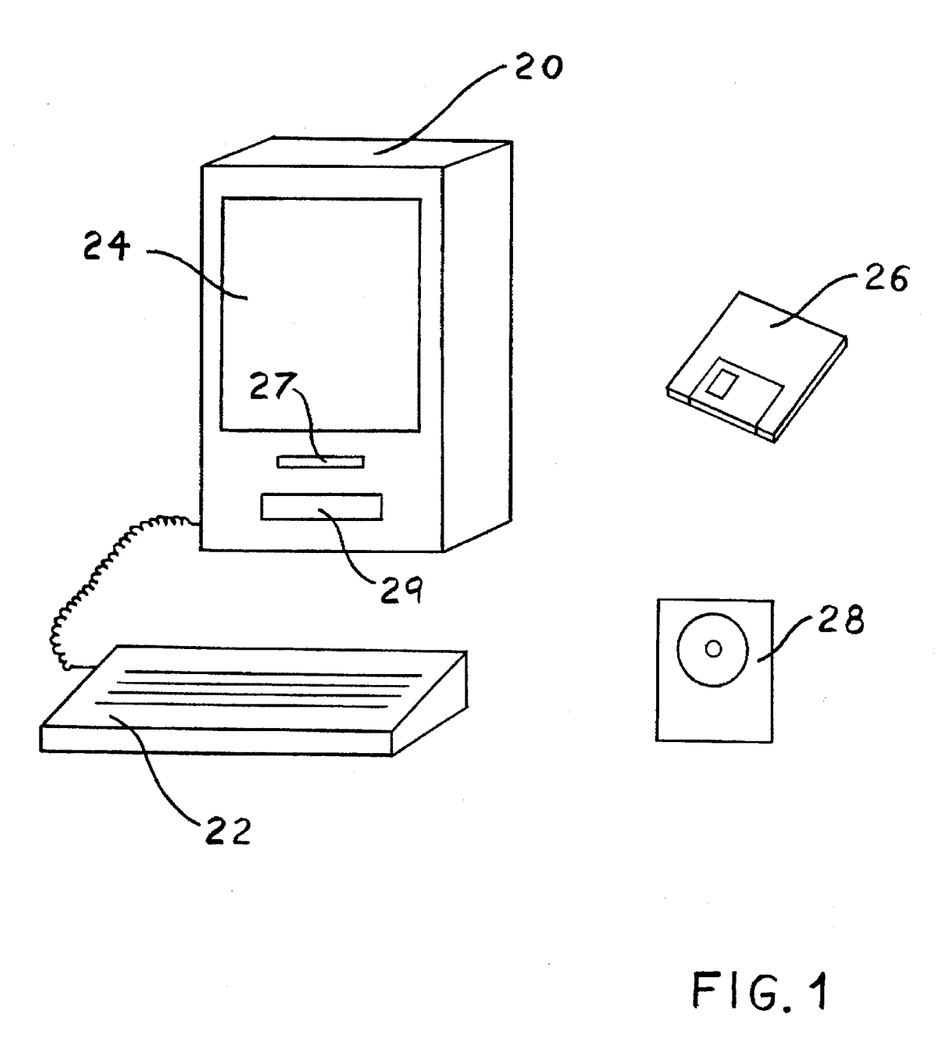
FIG. 1 is a pictorial view of the physical arrangement of the toy of the present invention utilizing a general purpose personal computer.

The computer may be a general purpose personal computer as shown in FIG. 1. Here we see illustrated a physical arrangement in which the present invention utilizes a personal computer 20, a keyboard 22 as an input device, and a display screen 24. The computer implemented process of the present invention is transferred to the personal computer 20 by inserting a floppy disk 26 or optical compact disk 28, within which the computer implemented process is embodied, into the diskette drive 27 or optical compact disk drive 29. The computer toy is then activated by issuing a suitable command to the computer's operating system.

Figure 2:
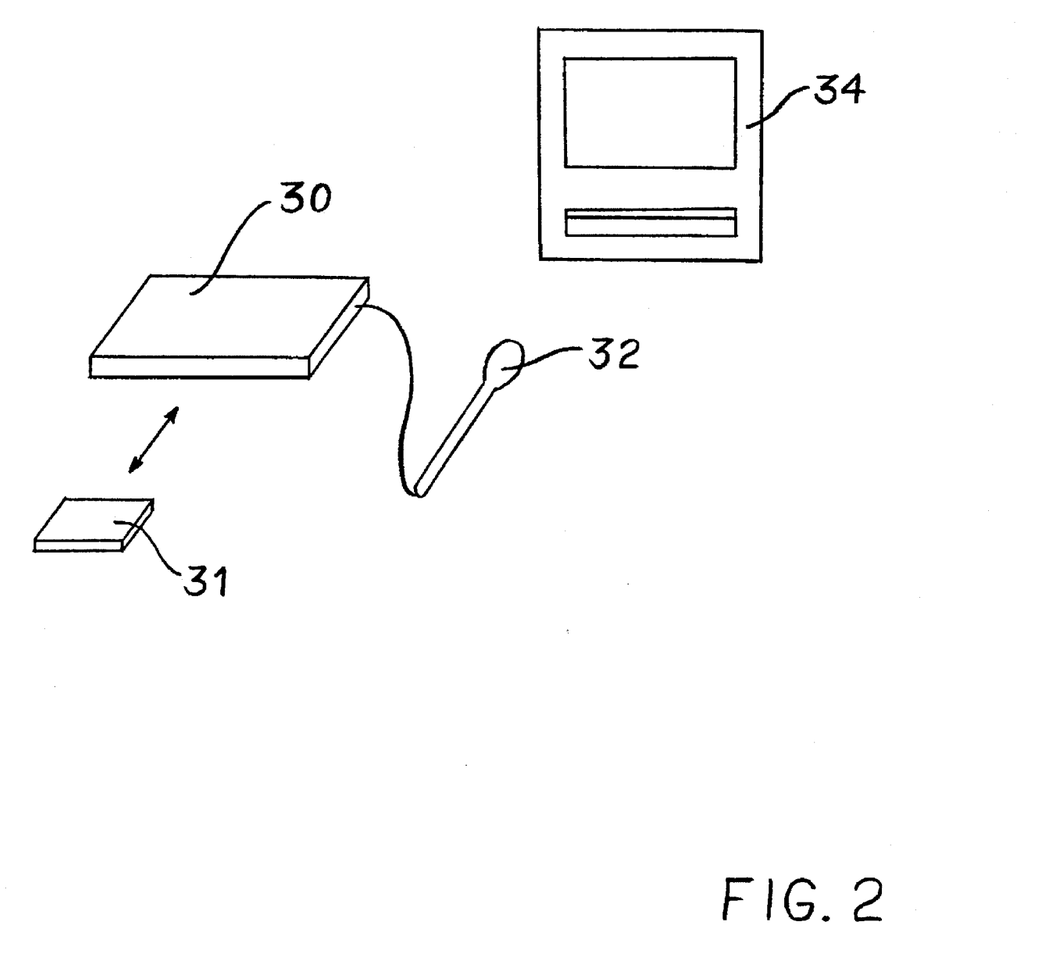
FIG. 2 is a pictorial view of the physical arrangement of the toy of the present invention utilizing a special purpose game system.

Referring now to FIG. 2, there is shown an alternate physical arrangement with the toy of this invention utilizing a special-purpose game system 30 such as the "Nintendo" brand system or the "Sega" brand system, which are designed to operate games and use a standard television set as a display 34. FIG. 2 also illustrates a computer wand 32 and an electronic cartridge 31 (within which this embodiment of the present invention is embodied) both of which are compatible with the special-purpose game system.

The present invention may also be manufactured as a self contained computer toy comprising the computer, input device, and display screen as a single unit.

Figure 3:
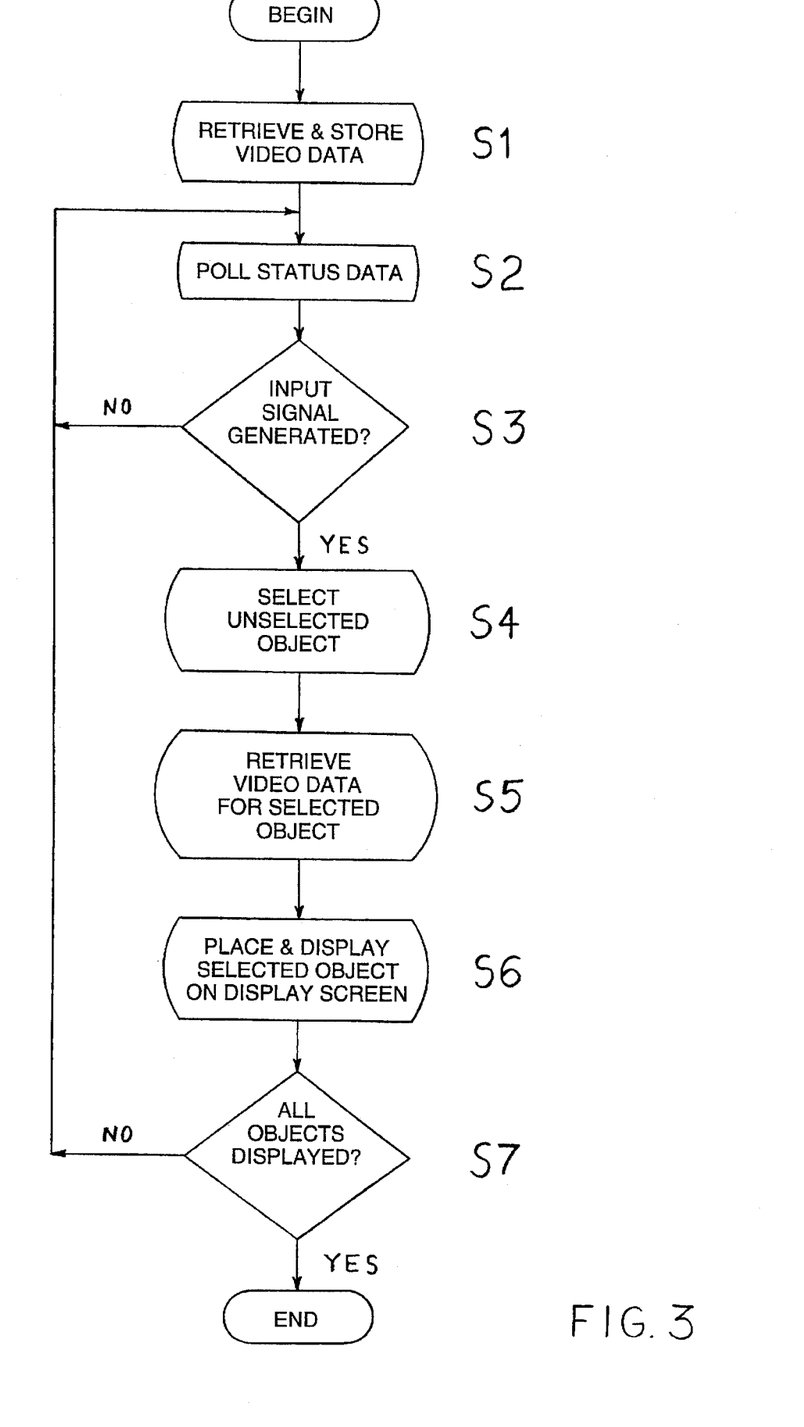
FIG. 3 is a flow diagram of the operation of one embodiment of the present invention.

In all cases, FIG. 3 is a flow chart for explaining a possible order of operations that may be executed by a computer processor to implement the present invention. In this flow chart, the simulation is initiated at step S1 wherein video data is retrieved from a floppy disk, CD ROM, or other storage medium and loaded into RAM (random access memory). This video data corresponds to a group of predetermined objects appropriate to a particular audiovisual simulation selected by the user. Next, the processor polls the status data of an input device (step S2). In step S3 the processor tests the status data. If an input signal was generated by the input device flow proceeds to step S4 and an object, that has not previously been selected, is then selected from the stored group of predetermined objects. Otherwise the flow will return to step S2 and the processor will again poll for an input signal. Once an object has been selected, the corresponding video data will be retrieved from RAM (step S5) and outputted to the display screen (step S6). In step S7 the processor tests if the group of objects has been exhausted. If the previously selected object was not the last remaining unselected object within the stored group of objects the flow will return to step S2 and the processor will once again poll the status data of the input device.

Figure 4:
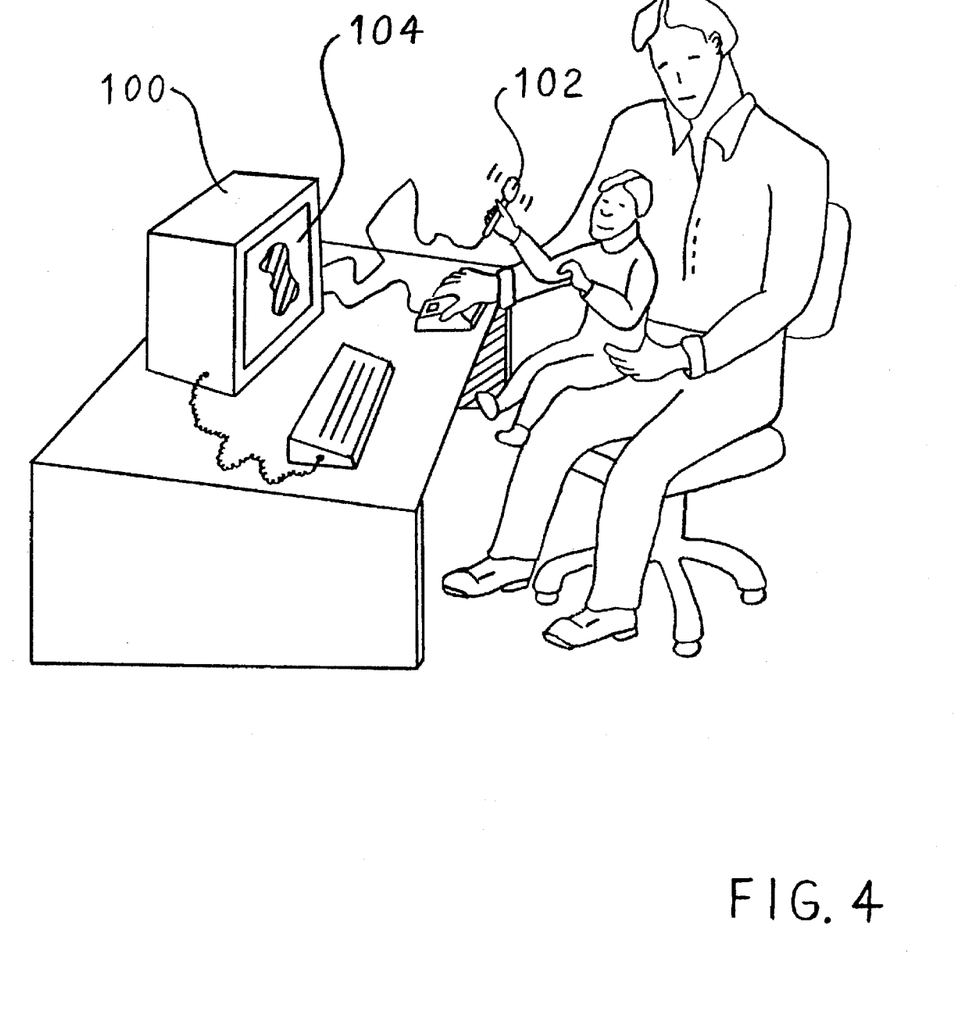
FIG. 4 is a perspective view of a baby, seated in the lap of an adult, using a computer wand input device to control the progression of an audio visual simulation on the display screen of a computer.

Referring now to FIG. 4, we see an infant, seated on the lap of an adult, playing with one embodiment of the computer toy of the present invention. As the infant shakes the input wand 102 the computer 100 selects and displays, at specific predetermined locations, each object of a group of predetermined objects creating an audiovisual simulation on the display screen 104. The more vigorously the infant shakes the input wand the faster the objects are displayed and the faster the simulation progresses. The simulation ends when all of the objects have been placed at their appropriate locations on the screen thereby creating a predetermined composite picture. A different audiovisual simulation occurs whenever the computer accesses a different group of predetermined objects.

Figure 5A:
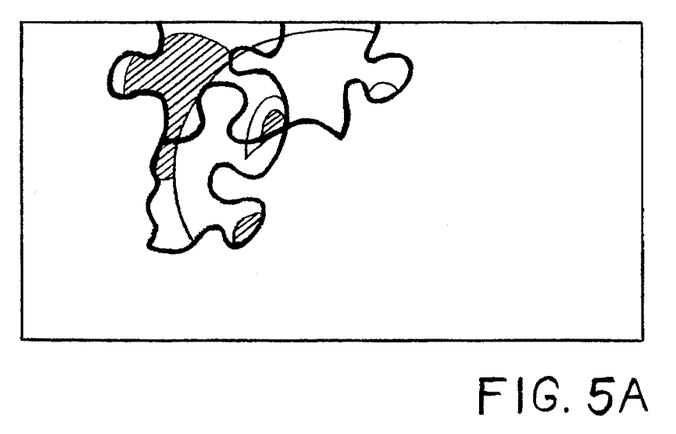
FIGS. 5A through 5C are sequential views of the display screen wherein the predetermined objects comprise interlocking shaped areas.
Figure 5B:
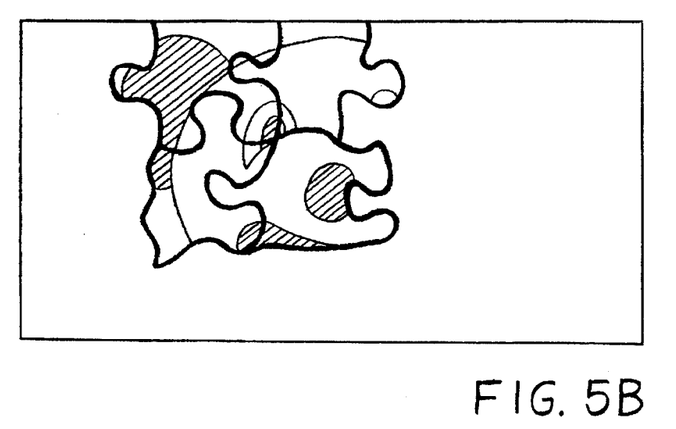
Figure 5C:
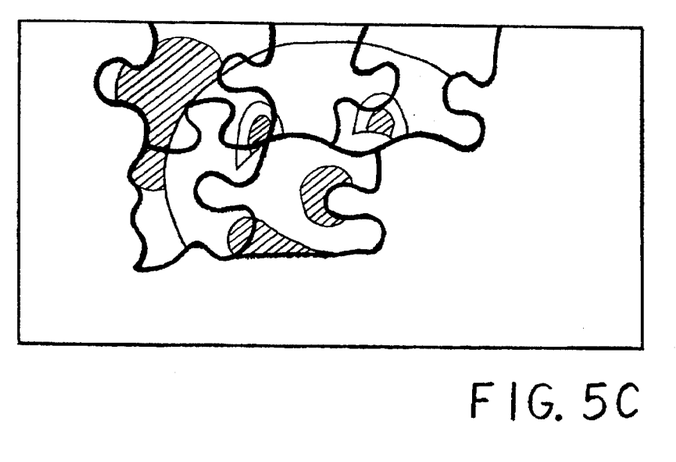

As an example, FIGS. 5A through 5C illustrate the audiovisual simulation of one embodiment of the present invention, namely, that of fitting together the pieces of a jigsaw puzzle. Here we see three sequential views of the display screen wherein the predetermined objects comprise interlocking shaped areas. Because the objects have interlocking shapes they look like puzzle pieces. Thus, by displaying the objects one at a time on the display screen the computer simulates the piecing together of a jigsaw puzzle. FIG. 5A shows the display screen after just three interlocking shaped areas have been displayed (i.e. with only three pieces of the puzzle in place). In FIG. 5B we see the screen after a fourth interlocking shaped area has been displayed at its predetermined location corresponding to fitting in a fourth piece of the puzzle. Finally, FIG. 5C shows the screen after a fifth interlocking shaped area has been displayed at its predetermined location corresponding to fitting in a fifth piece of the puzzle. The computer selects and displays an object whenever an input signal is detected. As each object is displayed it appears as if another piece of the jigsaw puzzle has been fitted into place.

FIGS. 5A through 5C illustrate a simulation in which the puzzle pieces, one at a time, suddenly appear at their predetermined screen positions. However, the video data associated with each object may also comprise a simulation of placing the object in its correct screen position where it is then left to be displayed. Thus, video data corresponding to placing and displaying each puzzle piece on the screen may also simulate the puzzle pieces as gradually materializing, being painted into place, being slid into place, etc.

Figure 6A:
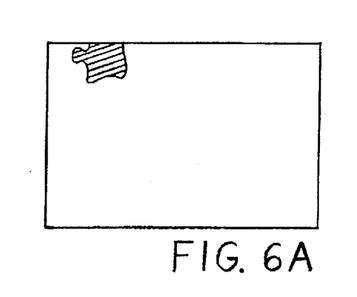
FIGS. 6A through 6I are sequential views of the display screen in various stages of progression of a simulation of the pieces of a jigsaw puzzle being slid into place.
Figure 6B:
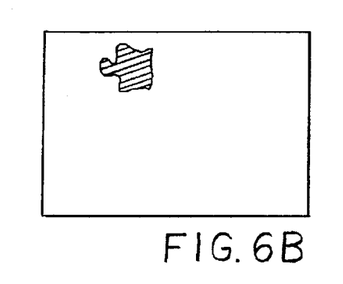
Figure 6C:
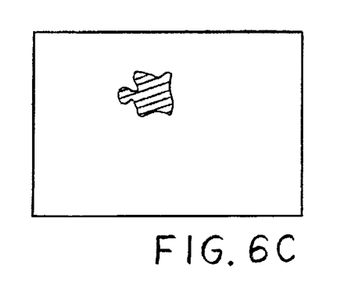
Figure 6D:
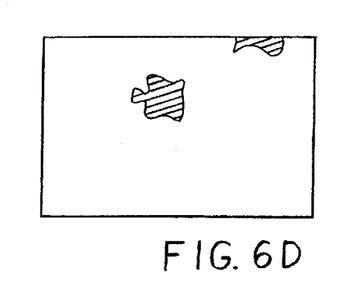
Figure 6E:
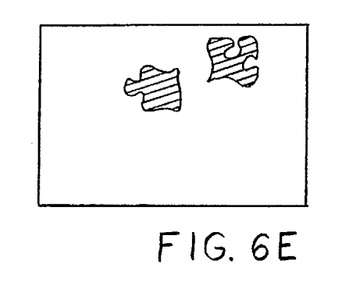
Figure 6F:
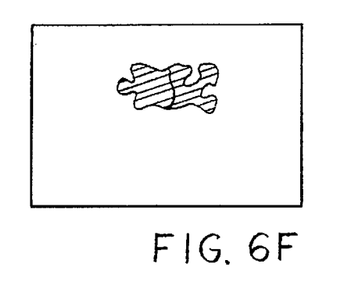
Figure 6G:
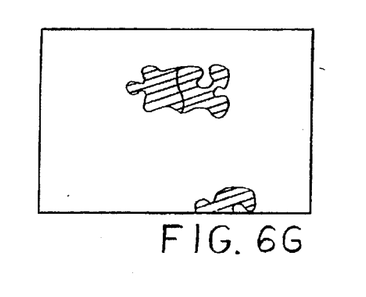
Figure 6H:
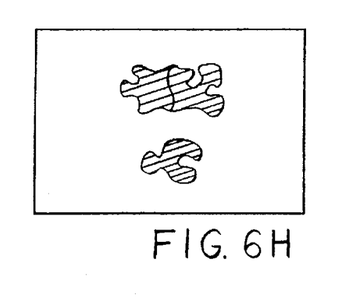
Figure 6I:
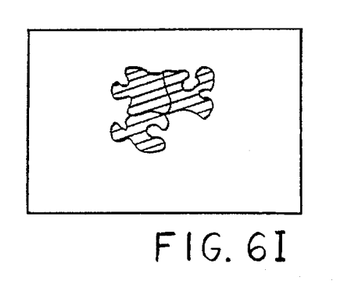

For example, FIGS. 6A through 6C show three sequential views of the display screen as a first puzzle piece is slid into place. This entire three screen sequence represents the video data associated with placing and displaying a single object at its predetermined position on the screen. As such, the entire three screen sequence will be triggered by a single input signal (e.g. from the strike of a key or shake of a computer wand). Similarly, FIGS. 6D through 6F show three sequential views of the display screen as a second piece is slid into place in response to a second input signal and FIGS. 6G through 6I show three sequential views of the display screen as a third puzzle piece is slid into place in response to a third input signal.

In another embodiment of the present invention, the audiovisual simulation takes the form of painting a picture. This effect is created when the video data for placing each object at its screen position corresponds to a sequence of paint strokes. For example, in FIGS. 7A through 7C we see three sequential views of the display screen corresponding to a sequence of paint strokes that place one object at its screen position. In this case, as video data associated with each of the predetermined objects is outputted to the display screen those objects will appear to be slowly painted upon the screen. Thus, by displaying all of the objects one at a time on the display screen the computer can simulate a picture being painted upon the display screen.

Figure 7A:
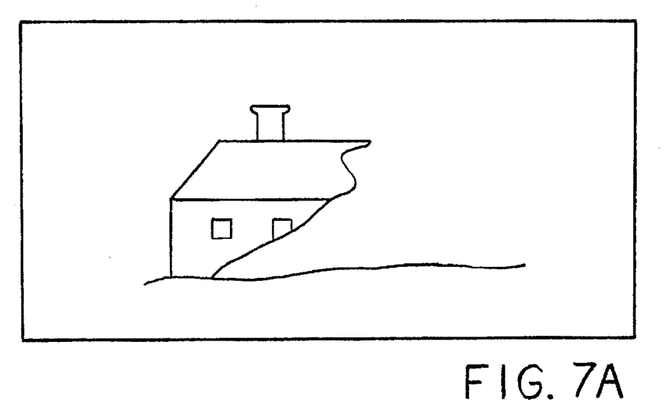
FIGS. 7A through 7C are sequential views of the display screen in various stages of progression of a simulation of painting a picture.
Figure 7B:
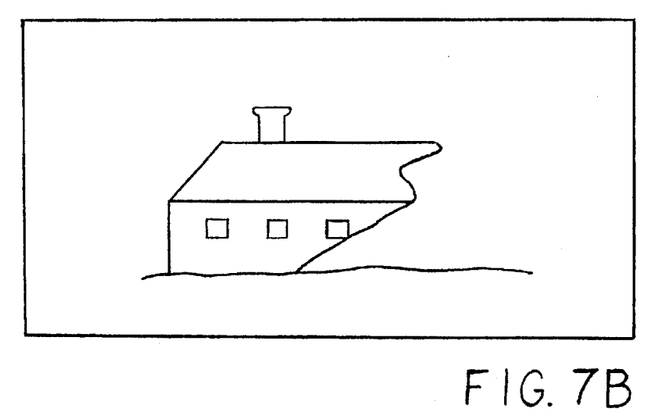
Figure 7C:
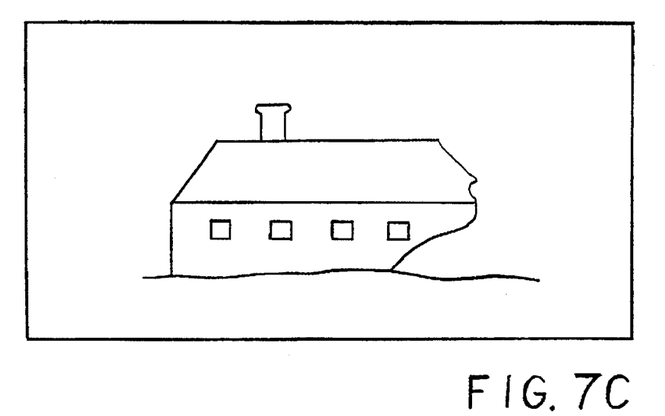

FIG. 7A shows the display screen displaying only one paint stroke corresponding to an object beginning to be placed onto the screen. In FIG. 7B we see the screen after a second paint stroke has been displayed. Finally, FIG. 7C shows the screen after displaying the final paint stroke necessary to place and display the object at it screen position. In a full simulation the computer selects, places, and displays an object whenever an input signal is detected. As the objects are placed and displayed it appears as if an entire picture is being painted upon the screen.

In still another embodiment of the present invention, the audiovisual simulation takes the form of connecting a prearranged pattern of dots to form a picture. For example, in FIGS. 8A through 8C we see three sequential views of the display screen wherein the predetermined objects comprise continuous lines and arcs that begin and end at marked locations on a fixed background. In this case, the computer begins the simulation by displaying a fixed background with a number of marked locations 1,2, . . . , 10, 11, and 12 as seen in FIGS. 8A through 8C.

Figure 8A:
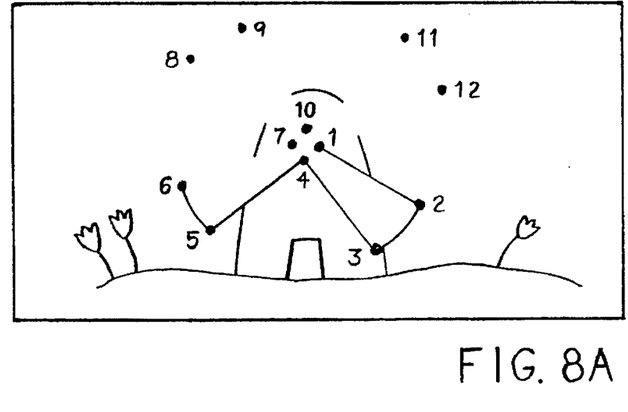
FIGS. 8A through 8C are sequential views of the display screen in various stages of progression of a simulation of connecting a prearranged pattern of dots to form a picture.
Figure 8B:
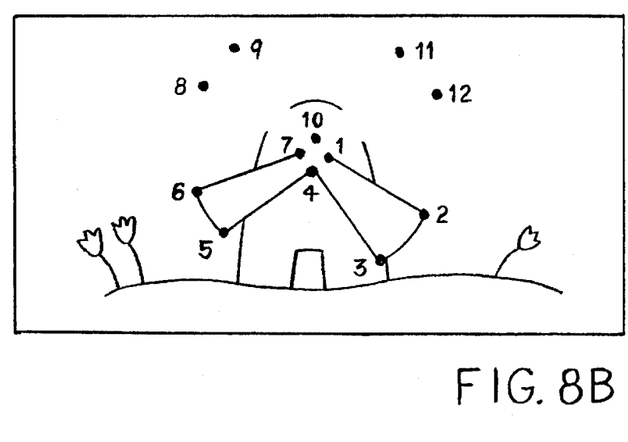
Figure 8C:
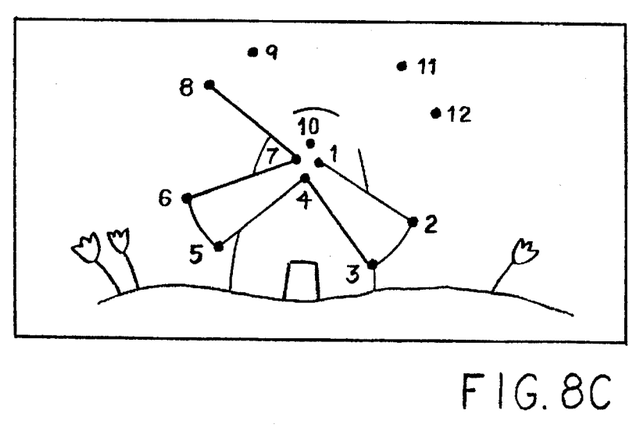

FIG. 8A shows the screen after the simulation has progressed to the point where five objects have been placed and displayed. These five objects are shown spanning the marked locations 1,2, 3, 4, 5, and 6. FIG. 8B shows the screen after a sixth object has been placed and displayed. The sixth object spans the marked locations 6 and 7. FIG. 8C shows the screen after a seventh object has been placed and displayed. The seventh object spans the marked locations 7 and 8. In this manner, by displaying the objects one at a time on the display screen, the computer can simulate a "connect-the-dots" type of game. As in the other simulations, the objects may be placed and displayed on the screen so as to suddenly appear or gradually materialize in place, so as to appear to be painted upon the screen, so as to appear to slide into place, etc.

It is evident that numerous different effects and simulations may be created by varying the predetermined group of objects used and the video data corresponding to the placement and display of each object within the group. Furthermore, because the simulation is automatic, (i.e. predetermined by the computer) it is particularly suited to infants and very young children. The user is not required to react to any commands or visuals on the display screen, Complex learned skills do not come into play and facile hand movements are not required, In fact, only those skills necessary to actuate an input device such as banging on a keyboard or shaking a computer wand come into play.

Nevertheless, there is a definite interaction between the user and the computer with appropriate feedback to stimulate and pique an infant or small child's interest. The computer will, for example, select, place, and display an object every time an input signal is generated. Thus, the progression of the predetermined simulation is fully controlled by the user. That is, the more quickly the input device is actuated the faster the simulation will progress.

Additionally, the sensitivity of the progression rate may be adjusted to particular users. For example, the computer may select, place, and display an object only every second or only every third time an input signal is generated. In each case, however, the simulation progresses in synchronization with input generated by the user. Thus, where the input device is a computer wand that is actuated by shaking an infant will be able to notice that the simulation only progresses as he or she shakes the wand.

Finally, the simulation may be augmented to include sound to further insure that it will hold the interest of an infant or very young child.

Because of all of these factors, an infant playing with the computer toy of the present invention will maintain interest, learn to associate actuation of the input device with progression of the simulation, and will improve his or her hand-eye coordination without the frustration of failure.

The present invention permits an infant or very young child to interact with a computer more easily than has previously been possible by making it feasible for the infant or child to control the progression of an audiovisual simulation. Thus, an improved computer toy has been disclosed.

Regarding the above description, it should be realized that other modifications and changes varied to fit particular operating requirements and environments will be apparent to those skilled in the art. Therefore, the invention is not considered limited to the examples chosen for purposes of disclosure, and covers all changes and modifications which do not constitute departures from the true spirit and scope of this invention. Accordingly, all suitable modifications and equivalents are intended to be encompassed by the present invention, the scope of which is indicated by the appended claims.

Having thus described the invention, what is claimed as being new and desired to be protected by Letters Patent of the United States is as follows:

1. A method of electronically simulating the creation of a predetermined composite picture, utilizing a computer with a display screen and an input device, the progression of the simulation being controlled by activating the input device, the method comprising:

(a) digitally storing video data which corresponds to placing and displaying each of a group of predetermined objects at an associated predetermined location, said objects comprising separate elements of a predetermined composite picture;

(b) detecting input signals which are generated and sent to the computer by the input device when the input device is activated;

(c) selecting at least one object from said group of predetermined objects when at least one input signal is detected;

(d) retrieving the stored video data associated with the selected objects;

(e) sending the retrieved video data to the display screen whereby video is generated corresponding to placing and displaying the selected objects at their stored associated predetermined locations; and (f) repeating steps (b), (c), (d), and (e), whereby the simulation of creating a composite picture automatically progresses.

2. A method of electronically simulating the creation of a predetermined composite picture according to claim 1, wherein the objects of said group of predetermined objects comprise interlocking shaped areas whereby the simulation has the appearance of fitting together the pieces of a jigsaw puzzle.

3. A method of electronically simulating the creation of a predetermined composite picture, utilizing a computer with an audio output, a display screen, and an input device, the progression of the simulation being controlled by activating the input device, the method comprising:

(a) digitally storing video data which corresponds to placing and displaying each of a group of predetermined objects at an associated predetermined location, said objects comprising separate elements of a predetermined composite picture;

(b) digitally storing audio data corresponding to each of the predetermined objects;

(c) detecting input signals which are generated and sent to the computer by the input device when the input device is activated;

(d) selecting at least one object from said group of predetermined objects when at least one input signal is detected;

(e) retrieving the stored video and audio data associated with the selected objects;

(f) sending the retrieved video data to the display screen whereby video is generated corresponding to placing and displaying the selected objects at their stored associated predetermined locations;

(g) sending the retrieved audio data to the audio output whereby sound is generated together with the video; and (h) repeating steps (c), (d), (e), (f), and (g), whereby the simulation of creating a composite picture with sound automatically progresses.

4. A method of electronically simulating the creation of a predetermined composite picture according to claim 3, wherein the objects of said group of predetermined objects comprise interlocking shaped areas whereby the simulation has the appearance of fitting together the pieces of a jigsaw puzzle.

5. A method of electronically simulating the creation of a predetermined composite picture according to claim 3, wherein the video data corresponding to placing and displaying a selected object at its associated predetermined location takes the form of displaying a sequence of paint strokes that apply color whereby the selected object appears to be painted on the display screen at its associated location.

6. A method of electronically simulating the creation of a predetermined composite picture according to claim 5, wherein the audio data stored by said auxiliary library means corresponds to paint brush strokes being applied to a surface whereby the generated sound and video has the appearance and sound of a picture being painted.

7. A method of electronically simulating the creation of a predetermined composite picture according to claim 3, wherein the video data corresponding to placing and displaying a selected object at its associated predetermined location takes the form of gradually increasing its opacity from transparent to opaque whereby the selected object appears to gradually materialize on the display screen at its associated location.

8. A method of electronically simulating the creation of a predetermined composite picture according to claim 4, wherein the video data corresponding to placing and displaying a selected object at its associated predetermined location takes the form of gradually increasing its opacity from transparent to opaque whereby the selected object appears to gradually materialize on the display screen at its associated location.

9. A method of electronically simulating the creation of a predetermined composite picture according to claim 3, wherein the video data corresponding to placing and displaying a selected object at its associated predetermined location takes the form of the selected object appearing suddenly at its associated location within the composite picture.

10. A method of electronically simulating the creation of a predetermined composite picture according to claim 4, wherein the video data corresponding to placing and displaying a selected object at its associated predetermined location takes the form of the selected object appearing suddenly at its associated location within the composite picture.

11. A method of electronically simulating the creation of a predetermined composite picture according to claim 4, wherein the video data corresponding to placing and displaying the selected object at its associated predetermined location gives the appearance of the selected object sliding from an off screen location into its associated location within the composite picture.

12. A method of electronically simulating the creation of a predetermined composite picture according to claim 11, wherein the audio data stored by said auxiliary library means corresponds to sliding the selected object over a surface whereby the generated sound and video has the appearance and sound of a puzzle piece sliding and fitting into place.

* * * * *